Feb. 25, 1936. J. J. INGELS 2,031,604
SHEET METAL CUTTER AND EDGER
Filed May 12, 1930 2 Sheets-Sheet 1
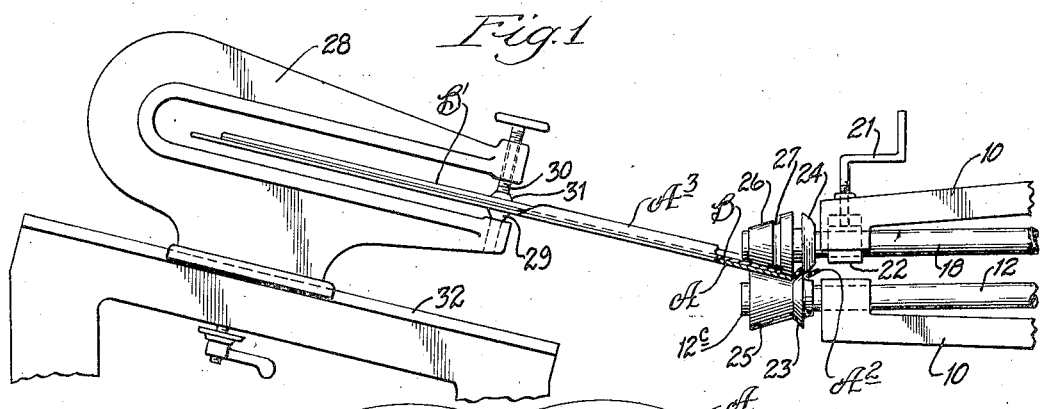
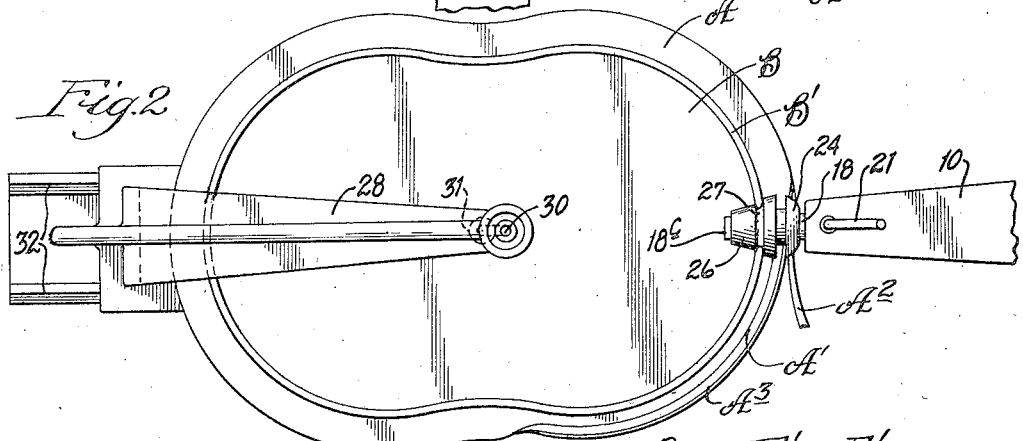
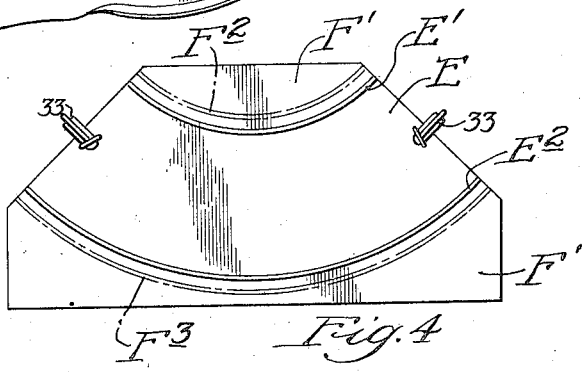
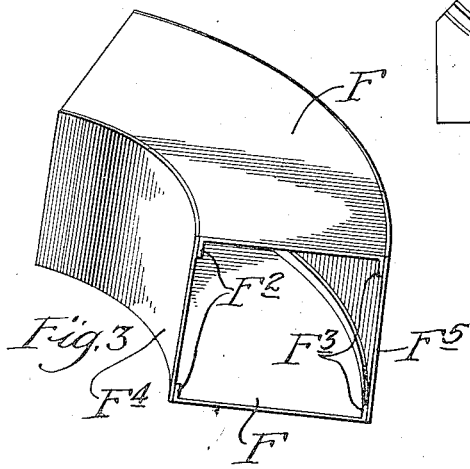
Inventor:
James J. Ingels,
By Henning & Henning
Attys.

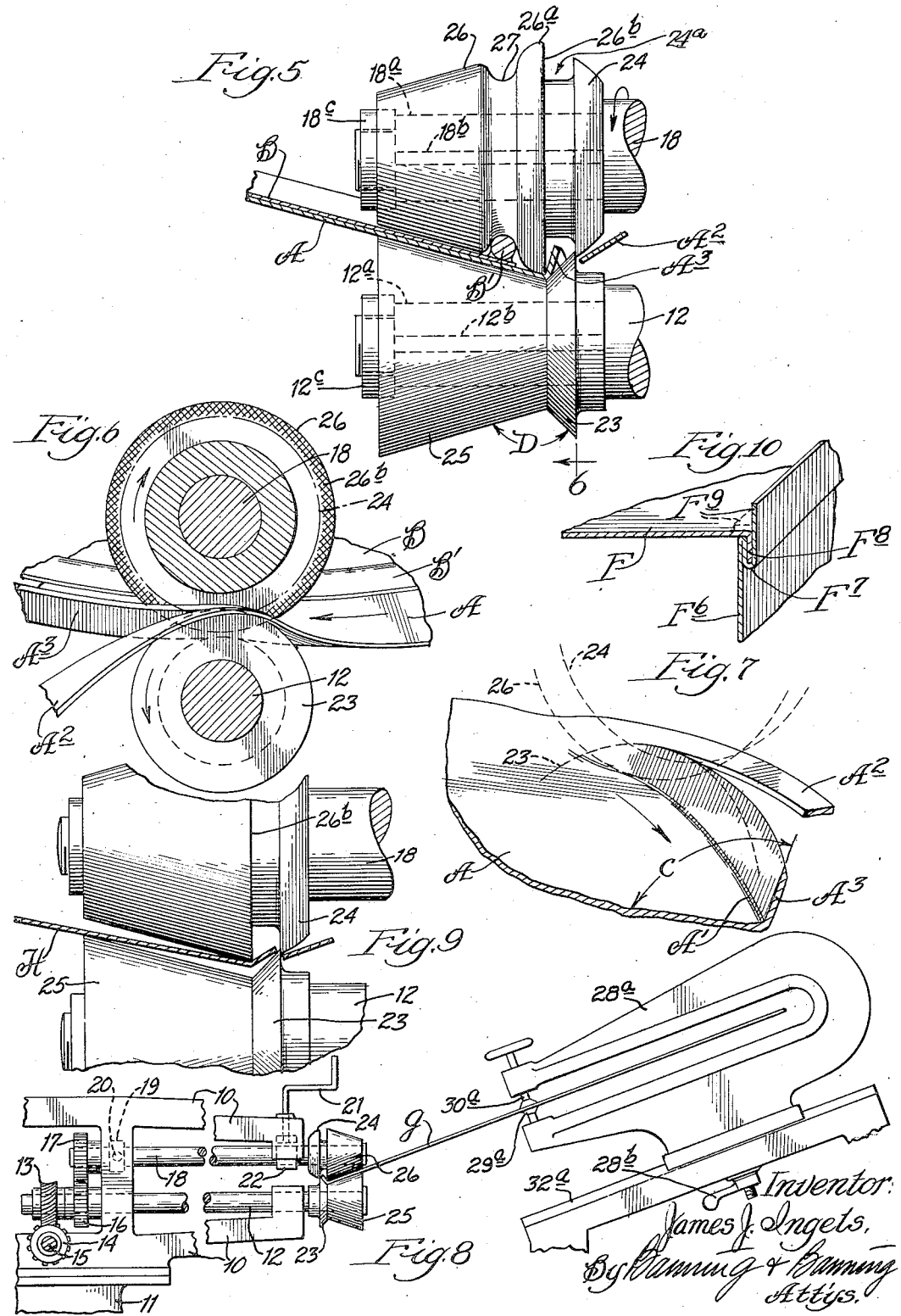

Patented Feb. 25, 1936

2,031,604

UNITED STATES PATENT OFFICE 2,031,604

SHEET METAL CUTTER AND EDGER

James J. Ingels, Chicago, Ill., assignor of one-half to Enoch Purnell and one-half to Henry G. Goelitz, both of Chicago, Ill.

Application May 12, 1930, Serial No. 451,565

17 Claims. (Cl. 153—29)

This invention relates to machines for cutting and edging sheet metal, and is adapted to be used in connection with a machine of the type shown and described in United States Letters Patent to Purnell No. 1,533,660.

An object of this invention is to provide means for cutting a sheet of metal and substantially simultaneously turning up an edge or flange. Heretofore, it has been common practice among tinners to cut the sheet to be edged by various methods, all of which were wasteful of time, after which the piece so cut was "edged", that is, an edge was turned up at an angle to the body of the sheet by a separate time-wasting operation.

Another object is to provide means for quickly and easily changing the angle at which this edge is formed to the body of the sheet.

Still another object is to provide means for cutting and edging quickly and accurately various shapes in sheet metal.

These and other objects, as will presently appear, are accomplished by the present invention which is fully described in the following specification, and shown in the accompanying drawings, in which—

Figure 1 is a side elevation of a machine embodying the invention;

Fig. 2 is a top plan view of the same;

Fig. 3 is a perspective view of a sheet metal elbow having top and bottom sectors made by this machine;

Fig. 4 is a top plan view of a sheet showing a jig secured thereto, from which and by which the sectors of Fig. 3 are formed;

Fig. 5 is an enlarged side elevation as seen in Fig. 1 of the combination cutters and rollers;

Fig. 6 is a partial section on the line 6 of Fig. 5;

Fig. 7 is a perspective view showing the cutters passing through the metal and illustrating the manner in which the edge is thrown up;

Fig. 8 is a view similar to Fig. 1 showing the device in a position to cut and edge a circular plate;

Fig. 9 is a partial view similar to Fig. 5 showing a modified form of roller as used to give a plate a flatter form of edge;

Fig. 10 is a partial section showing another method of uniting two parts of an elbow of the general form shown in Fig. 3.

The embodiment illustrated comprises a machine, as shown in Figs. 1 and 8, of the type shown and described in United States Letters Patent No. 1,533,660, in which there is a frame 10 mounted on a suitable base 11, and having a shaft 12 which is driven by means of a worm wheel 13 which meshes with a worm 14 on a shaft 15, which is driven from any suitable source of power. The shaft 12 is journaled in suitable bearings in the frame 10, and has keyed thereon a spur gear 16 which meshes with a gear 17, which is keyed on a shaft 18. This shaft 18 is journaled in a bearing 19 which is mounted on trunnions 20 so that the outer end of the shaft 18 can be raised and lowered with respect to the shaft 12 by means of a screw 21, which in turn serves to raise and lower a bearing 22 in which the shaft 18 is journaled, and which is guided in the outer end of the upper portion of the frame 10.

In Figs. 1 and 5 are shown the combination rollers and cutters which constitute the essential features of the present invention. The outer ends of the shafts 12 and 18 are reduced at 12$^a$ and 18$^a$ respectively, and are provided with keys 12$^b$ and 18$^b$, the ends of these shafts terminating in reduced threaded portions on which are screwed tightening nuts 12$^c$ and 18$^c$. Beveled cutters 23, 24 are snugly fit on the reduced portions 12$^a$ and 18$^a$ respectively, and these are very accurately fitted with suitable thrust bearings (not shown) on the shafts 12 and 18. Outside these are placed two reverse frusto-conical rollers 25 and 26 of suitable hardened metal which are adapted to grip between them a sheet A which is to be cut and edged.

While Figs. 1 and 3 show the use of a jig B, which in this instance is a flat sheet having a wire B' secured around its edge as by welding or brazing, it will be understood that this jig, together with its function, may be omitted. For the sake of clearness, I will describe first the operation of the rollers and cutters with the jig B omitted, the sheet A in that case being fed to the machine by hand, and also guided by hand as it passes therethrough, as will readily be apparent to anyone skilled in this art.

Among the essential features of the rollers and cutters is that the frusto-conical member 25 has an element of its face set at something more than 90° to an element of the face of the beveled back of the cutter 23, and that the largest portion or base 26$^a$ of the cone 26 forming a circular shoulder shall lie just over the junction of the conical surfaces of 23 and 25 so that the sheet A will be firmly pressed up into the corner thus formed between the conical surfaces of 23 and 25. This is accomplished by properly setting the screw 21 to give the desired pressure between the base portion 26$^a$ and the frusto-conical member 25 on the sheet A which is gripped therebetween. In order to insure that the sheet A will be propelled therebetween the cutters and rollers which are traveling in opposite rotative directions, the edge 26$^b$ is slightly roughened or knurled to cause it to bite into the sheet A along the line AI, as shown in Fig. 7.

The sharp edges of the cutters 23 and 24 overlap somewhat, as shown in Fig. 5, thereby causing the overhanging portion A$^2$ of the sheet A to be severed just before it reaches the position shown in Fig. 5. The stress of the metal is such that the edge A$^3$ springs away from the cutters and from the strip A$^2$ which has been severed therefrom, so that the angle C (Fig. 7) made by the edge A$^3$ and the body of the sheet A is considerably less than the angle D formed by elements of the cutter 23 and the roller 25. This is due very largely to the force with which the knurled edge 26$^b$ of the roller 26 forces the sheet metal A firmly into the bottom of what might be called the groove joining the back of the cutter 23 and the roller 25. The turned up edge A$^3$ is forced into the annular groove 24$^a$ between the cutter 24 and the base 26$^a$ which is provided for this purpose.

When the shafts 12, 18 are run slowly enough to permit the cutters and rollers thus to be used as a hand tool, the sheet metal A can be fed thereto by hand, and can be very accurately guided so as to cause the cutters 23, 24 to follow closely a line, as previously laid out, on the sheet metal A. This sheet can readily be turned so as to cut and form the edge shown in Fig. 7, wherein the sharpest bend of the flanged edge A$^3$ is of about a three inch radius in either direction, that is, with the center of the radius lying within or without the sheet.

The machine, as just described, however, is of the hand operated type which must necessarily be run quite slowly in order to give the operator time to follow a line previously described on the sheet. Certain types of work of this kind, however, lend themselves to very much faster operation. Such, for example, is the kind in which there are elbows of the type shown in Fig. 3, which are to be made up in considerable numbers exactly alike. Another is a form shown in Figs. 1 and 2. For the sake of illustration, however, this is shown only as a fanciful form. It might readily be made round, oval, or take any number of odd shapes so long as the smallest radius to be cut thereby is not less than three inches.

Referring now to Figs 1 and 2, one of the methods will be described employing a jig having a bead B', consisting of a wire, preferably hardened, so as to prevent wear, brazed or welded thereto and operating in a groove 27 in the upper roller 26. This groove is quite close to the knurled edge 26$^b$ about which the sheet A is bent, and allowance for this distance must be made in laying out the jig B for any given piece of work. The edges of the groove 27 are rounded so as to permit the jig B to be turned so that the cutter can follow the various beads of the wire bead B'.

Having formed the jig B, as shown in Fig. 2, it is clamped to the sheet A of metal to be cut and edged by means of a well known form of centering clamp, consisting of a U-shaped yoke 28, having a rotatable clamping member 29 journaled therein and opposed by a clamping screw 30, with a clamping jaw 31 rotatably mounted thereon.

From the foregoing it will be seen that as the shafts 12, 18 are rotated, the rollers 25, 26 will cause the sheet A to be drawn around into the cutters 23, 24 so that the sheet will be simultaneously cut and edged. At the same time the wire bead B' of the jig B will follow the groove 27 of the upper roller 26 and the sheet A, and the jig B will be turned about the axes of the members 29, 30. Owing to the irregularity and the eccentricity of the bead B', the center of the clamping members 29, 30 will move toward and from the cutters. To accommodate this, the centering clamp 28 is mounted upon suitable guides 32 which are set at the angle normally assumed by the plate. Thus as the center upon which the sheet rotates varies with respect to the cutters 23, 24, the centering clamp 28 will slide up and down the guideways 32.

The cutter 24 is preferably made slightly larger in diameter than the cutter 23, is slightly rounded, as shown in Fig. 5, and has a slightly lower angle than the cutter 23.

In Fig. 4 is shown a modified form of jig E which is particularly adapted for making the top and bottom sectors F of the elbow shown in Fig. 3. These are made from a plate of sheet metal F$^1$ which may be cut substantially to form, as shown in Fig. 4, after which the jig E is clamped thereto by means of screw clamps, or the like, 33. The jig E is provided with inner and outer tracks or beads E$^1$ and E$^2$, as has previously been described for the jig B, and these engage the groove 27 of the roller 26, one at a time, as shown in Fig. 5. These tracks are open-ended and consequently can be inserted by hand into the groove 27 while the rollers are in operation. When this is done the rollers grip the plate F$^1$ and jig E and draw them through the cutters to cut and form the inner edge F$^2$. The plate is then reversed and the bead E$^2$ is fed to the groove 27, with the result that the outer edge of the plate is cut and edged to form the turned up edge F$^3$.

In this way the top and bottom sectors F, F of the elbow of Fig. 3 are formed. The elbow is then completed by adding the inner and outer plates F$^4$ and F$^5$ which are secured to the flanged edges F$^2$ and F$^3$ in any suitable manner, such as by welding, spot welding, soldering, brazing, or riveting. This form of elbow is particularly useful for large air ducts, and the like, such as are used in the ventilation of buildings.

In Fig. 10 is shown another method of building up an elbow with two sectors F with inner and outer plates F$^6$ which are provided at their edges with return belts F$^7$, the outer one being adapted to engage the flanged edge F$^8$. In this case the outer edge F$^9$ of the sheet F$^6$ extends beyond the sector F and can be built over into the dotted line position thereby locking the two sections together.

While only two forms of jigs B and E are shown, it will be understood that these are merely illustrative, and that an infinite number of jigs may be employed with this machine for edging plates of all sorts of shapes and sizes.

Moreover, it is not necessary to use a jig with this cutter at all for many classes of work. Where a jig is used, however, the speed of the cutters can be greatly increased over that which would be permissible where the work is to be fed to the cutters so as to permit them to accurately follow a previously scribed line.

When using the jig B of Figs. 1 and 2, it is necessary to open the cutters, insert the jig B and sheet A, and then close or partly close the cutters thereover, preferably before the shafts 12, 18 are set in rotation. The cutters are then set down by means of the screw 21 to the desired point, and continues until the cut is completed.

In Fig. 8 is shown a modified form of the device as used as a combination circular shear and edger. In this case the centering clamp 28ª is firmly locked to the guides 32ª by means of a locking clamp 28ᵇ, so that the axis of the clamping members 29ª, 30ª stand out a fixed distance from the cutters. When now the cutters are set to cutting position, and the shafts 12, 18 rotated, the edge is cut and turned up, as previously described, and the cut will continue until completed on the sheet G, and when completed will be a perfect circle, whose center is the axis of the clamping members 29ª and 30ª.

In certain classes of work it is desirable that the edge thrown up will not be at such a sharp angle to the body of the plate. This is shown in Fig. 9, in which the plate H passes through between the cutters which are not fully clamped down. Such an edge, for example, is desirable in making certain forms of chair backs for theaters, and the like.

While I have shown and described but a few embodiments of my invention, it is to be understood that it is capable of many modifications. Changes, therefore, in the construction and arrangement, may be made which do not depart from the spirit and scope of the invention as disclosed in the appended claims.

I claim:

1. In a machine for cutting and edging sheet metal, two overlapping rotary cutters between which the sheet metal passes, and a shoulder adjacent the cutting point of said cutters over which said metal is bent while being cut to form a turned-up integral edge substantially at right angles to the adjacent portion of the sheet.

2. In a machine for cutting and edging sheet metal, two overlapping rotary cutters between which the sheet metal passes, and a shoulder adjacent the cutting point of said cutters over which said metal is bent while being cut to form a turned-up integral edge substantially at right angles to the adjacent portion of the sheet, said cutters having means for propelling the sheet metal as it is fed to said cutters.

3. In a machine for cutting and edging sheet metal, two overlapping rotary cutters between which the sheet metal passes, and a shoulder adjacent the cutting point of said cutters but spaced therefrom over which said metal is bent while being cut to form a turned-up integral edge, said shoulder being roughened to provide means for propelling the sheet metal as it is fed to said cutters.

4. In a machine for cutting and edging sheet metal, two overlapping rotary cutters driven in opposite directions on substantially parallel shafts and between which the sheet metal passes, and a shoulder adjacent the cutting point of said cutters over which said metal is bent while being cut to form a turned-up integral edge the shoulder being spaced from the cutter on the same axis by an annular groove.

5. A pair of rotary cutters and edgers for sheet metal, said cutters being oppositely beveled and having oppositely angled frusto-conical rollers between which the metal to be cut passes without being bent, one of said cutters being beveled oppositely to its adjacent roller and providing a depression into which the metal is bent by the opposite roller to form the turned up edge at substantially the same time as the metal is cut.

6. A pair of rotary cutters and edgers for sheet metal, said cutters being oppositely beveled and having oppositely angled frusto-conical rollers between which the metal to be cut passes without being bent, one of said rollers providing a shoulder which co-operates with the beveled back of the opposing cutter to bend the sheet metal to form a turned up edge at substantially the same time as the metal is cut.

7. A pair of rotary cutters and edgers for sheet metal, said cutters being oppositely beveled and having oppositely angled frusto-conical rollers between which the metal to be cut passes, one of said rollers providing a roughened shoulder over which the metal is bent to form a turned up edge at substantially the same time as the metal is cut.

8. A pair of rotary cutters and edgers for sheet metal, said cutters being oppositely beveled and having oppositely angled frusto-conical rollers between which the metal to be cut passes, one of said rollers providing a shoulder over which the metal is bent to form the turned up edge at substantially the same time as the metal is cut, and a jig having a track adapted to be fastened to the sheet metal to be cut and edged, said rollers having means co-operating with said track to guide said cutters through the sheet metal to which said jig is fastened.

9. A pair of rotary cutters and edgers for sheet metal, said cutters being oppositely beveled and having oppositely angled frusto-conical rollers between which the metal to be cut passes, one of said rollers providing a shoulder over which the metal is bent to form the turned up edge at substantially the same time as the metal is cut, and a jig having a track adapted to be fastened to the sheet metal to be cut and edged, said rollers having a groove co-operating with said track to guide said cutters through the sheet metal to which said jig is fastened.

10. In a machine for cutting and edging sheet metal, two adjacent shafts, a rotary cutter on each of said shafts, a frusto-conical roller adjacent each of said cutters, and means for moving the outer ends of said shafts toward and from each other to vary the distance between said rollers, the edge at the base of one roller being adapted to force the sheet to be cut toward the circular crotch formed by the other roller and its cutter.

11. In a machine for cutting and edging sheet metal, two adjacent shafts, a rotary cutter on each of said shafts, a frusto-conical roller adjacent each of said cutters, and means for moving the outer ends of said shafts toward and from each other to vary the distance between said rollers, the edge at the base of one roller being adapted to force the sheet to be cut toward the circular crotch formed by the other roller and its cutter, said rollers being placed with their cones in opposite directions, and said cutters being beveled in opposite directions to the cone on the same shaft.

12. In a machine for cutting and edging sheet metal, two adjacent shafts, a rotary cutter on each of said shafts, a frusto-conical roller outside each of said cutters, and means for moving the outer ends of said shafts toward and from each other to vary the distance between said rollers, the edge at the base of one roller being adapted to force the sheet to be cut toward the circular crotch formed by the other roller and its cutter.

13. In a machine for cutting and edging sheet metal, two overlapping rotary cutters each having a cutting disk between which the sheet metal passes, a circular shoulder on one of the cutters of greater diameter than its cutting disk, said shoulder being spaced from the cutting disk and the intervening space being undercut to permit the metal overlapping the circular shoulder to be folded about said shoulder, and co-operating means on the other cutter to bend said overlapping metal about said shoulder as the edge is severed.

14. In a machine for cutting and edging sheet metal, two overlapping rotary cutters each having a cutting disk between which the sheet metal passes, a circular shoulder on one of the cutters of greater diameter than its cutting disk, said cutters being beveled to present acute edges to the sheet metal to be cut, said shoulder being spaced from the cutting disk and the intervening space being undercut to permit the metal overlapping the circular shoulder to be folded about said shoulder, and co-operating means on the other cutter to bend said overlapping metal about said shoulder as the edge is severed.

15. In a machine for cutting and edging sheet metal, two overlapping rotary cutters each having a cutting disk between which the sheet metal passes, a circular shoulder on one of the cutters of greater diameter than its cutting disk, the opposite cutter being beveled to present an acute edge to the sheet metal to be cut, said shoulder being spaced from the cutting disk and the intervening space being undercut to permit the metal overlapping the circular shoulder to be folded about said shoulder, and co-operating means on the other cutter to bend said overlapping metal about said shoulder as the edge is severed.

16. In a machine for cutting and edging sheet metal, two overlapping rotary cutters each having a cutting disk between which the sheet metal passes, a circular shoulder on one of the cutters of greater diameter than its cutting disk, the opposite cutter being beveled to present an acute edge to the sheet metal to be cut, said shoulder being spaced from the cutting disk and the intervening space being undercut to permit the metal overlapping the circular shoulder to be folded about said shoulder, and co-operating means on the other cutter including the beveled inner face of the cutter to bend said overlapping metal about said shoulder as the edge is severed.

17. A pair of rotary cutters and edgers for sheet metal, said cutters being oppositely beveled and having oppositely angled frusto-conical rollers between which the metal to be cut passes without being bent, one of said cutters being beveled oppositely to its adjacent roller and providing a depression into which the metal is bent by the opposite roller to form the turned up edge at substantially the same time as the metal is cut, the opposite roller having a roughened edge over which the metal is bent.

JAMES J. INGELS.